United States Patent [19]
Schneider et al.

[11] Patent Number: 5,495,549
[45] Date of Patent: Feb. 27, 1996

[54] OPTICAL FIBER SPLICE CLOSURE

[75] Inventors: Pina R. Schneider, Matawan; Eric J. Hermsen, Howell; Ronald D. DeChamps, Jackson; Wayne L. Peterson, Milltown, all of N.J.

[73] Assignee: Keptel, Inc., Tinton Falls, N.J.

[21] Appl. No.: 198,562

[22] Filed: Feb. 18, 1994

[51] Int. Cl.⁶ .................................................... G02B 6/36
[52] U.S. Cl. ............................................ 385/135; 385/134
[58] Field of Search ..................................... 385/134, 135

[56] References Cited

U.S. PATENT DOCUMENTS

| | | | |
|---|---|---|---|
| 4,595,255 | 6/1986 | Bhatt et al. | 385/135 |
| 4,793,682 | 12/1988 | Cooper | 385/135 |
| 4,927,227 | 5/1990 | Bensel, III et al. | 385/135 X |
| 4,958,903 | 9/1990 | Cobb et al. | 385/135 |
| 5,042,901 | 8/1991 | Merriken et al. | 385/135 |
| 5,131,066 | 7/1992 | Foss | 385/135 |
| 5,249,252 | 9/1993 | Noto | 385/135 |
| 5,249,253 | 9/1993 | Franckx et al. | 385/135 |
| 5,255,337 | 10/1993 | Theys et al. | 385/135 |
| 5,261,024 | 11/1993 | Allen et al. | 385/135 |
| 5,278,933 | 1/1994 | Hunsinger et al. | 385/135 |
| 5,313,546 | 5/1994 | Toffetti | 385/135 |
| 5,402,515 | 3/1995 | Vidacovich et al. | 385/135 |

OTHER PUBLICATIONS

Raychem advertisement Bulletin "TRAC Aerial Closure" 2 pages (No date).

*Primary Examiner*—Brian Healy
*Attorney, Agent, or Firm*—R. Gale Rhodes, Jr.

[57] ABSTRACT

Closure for containing splices between optical fibers including a frame providing a plurality of optical fiber cable entry/exit ports, splice tray stacker mounted to the frame and for stacking a plurality of splice trays, and an outer cover for being fastened closed around the frame and the splice tray stacker to provide mechanical and environmental protection thereto.

27 Claims, 5 Drawing Sheets

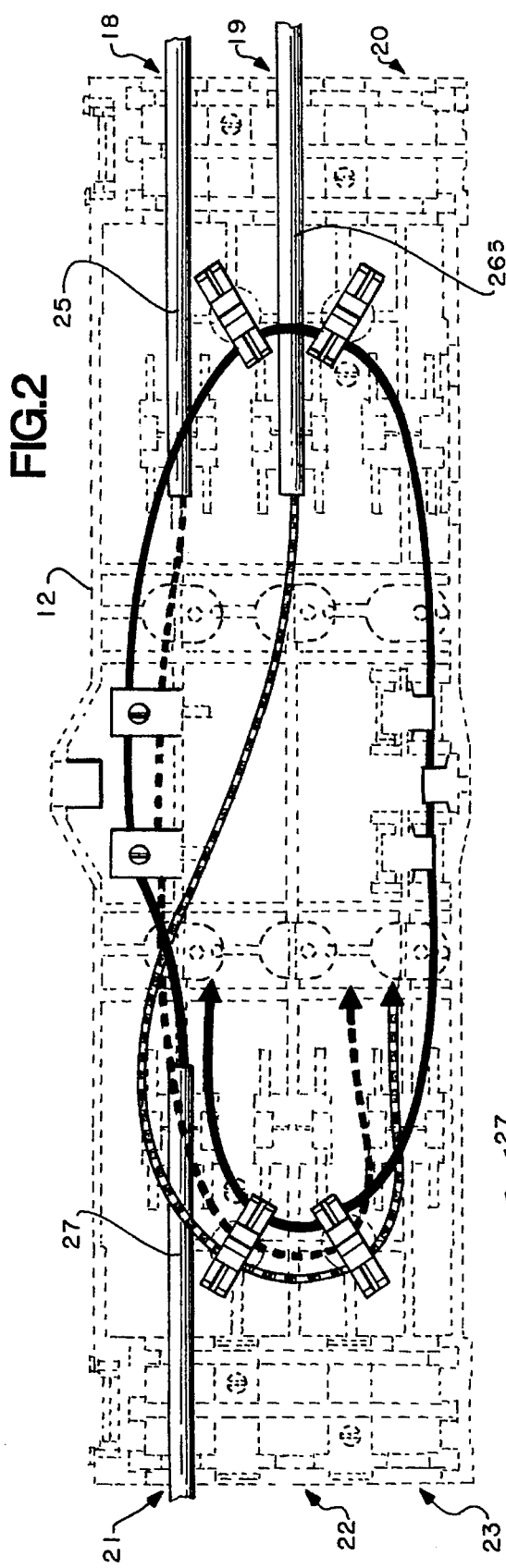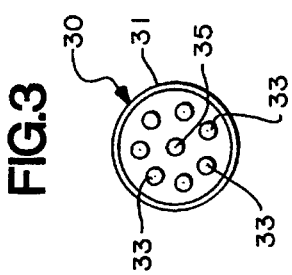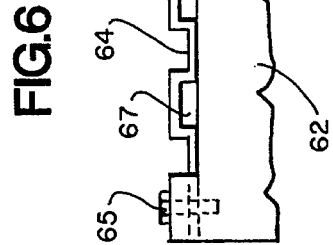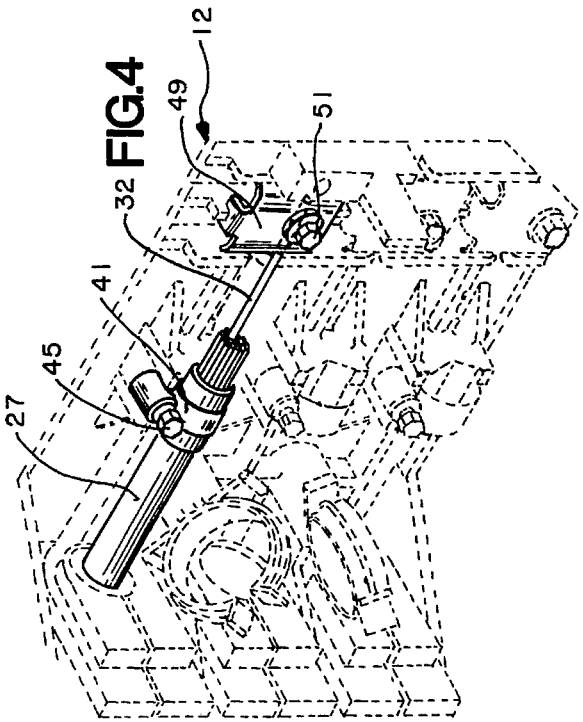

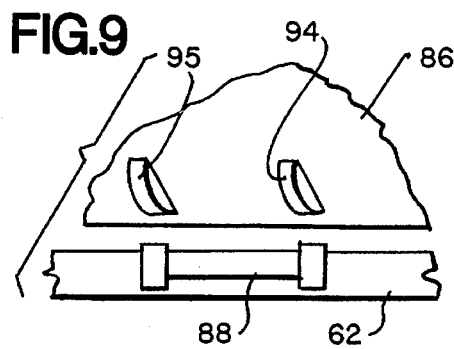
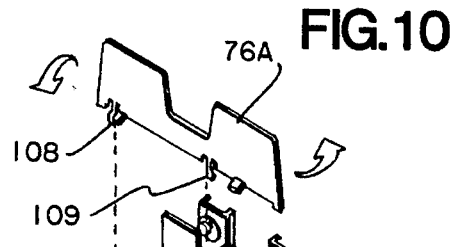
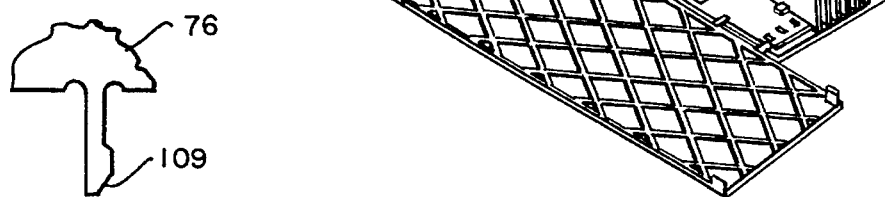
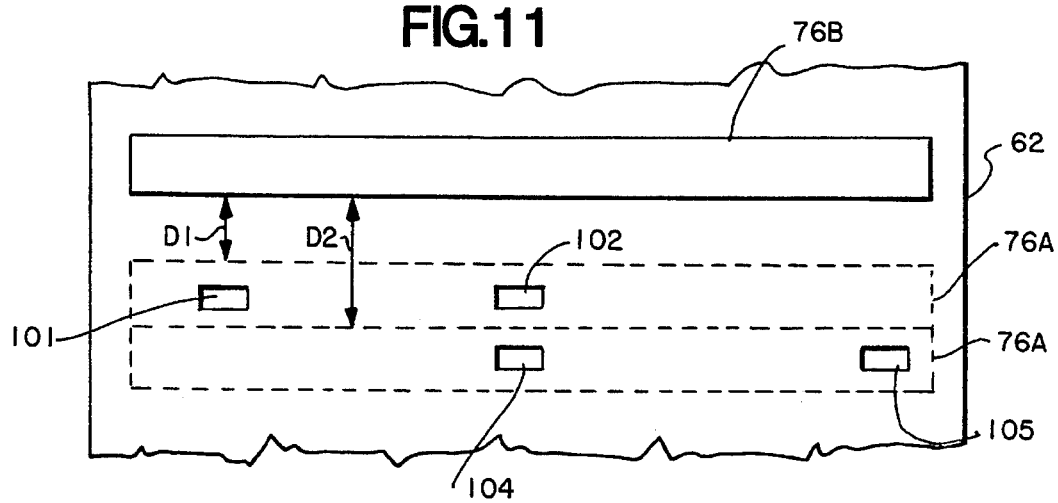
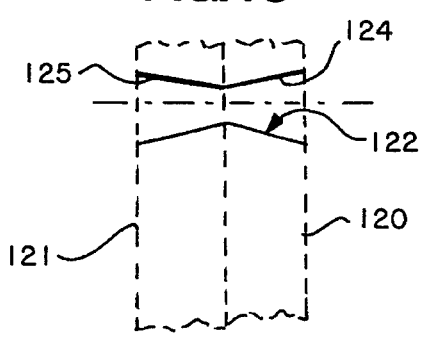
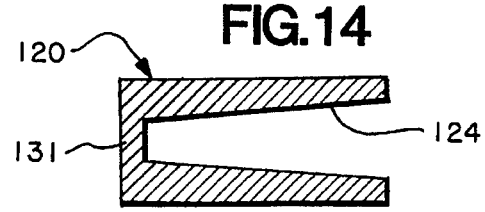
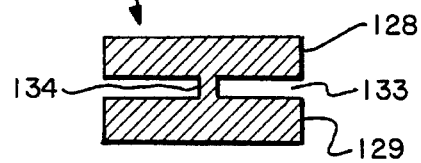

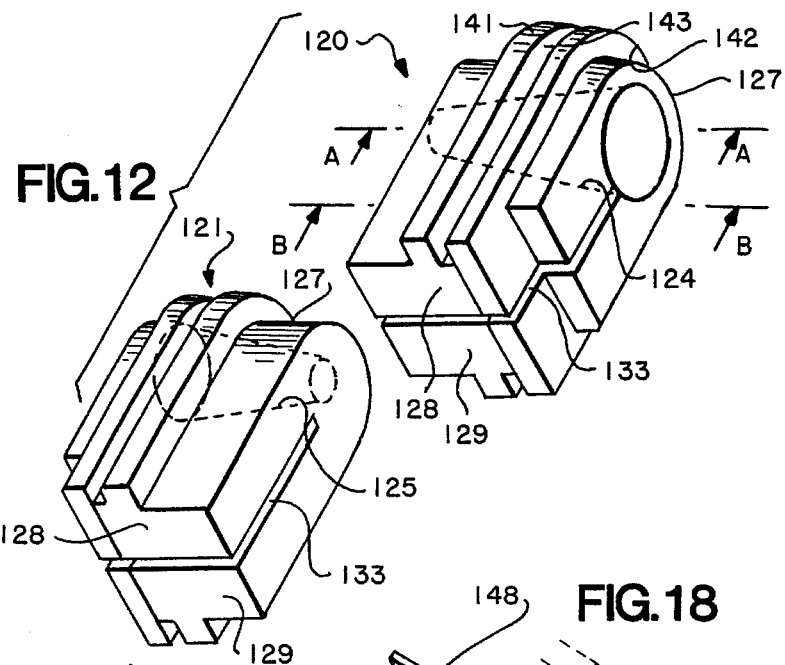
FIG. 12
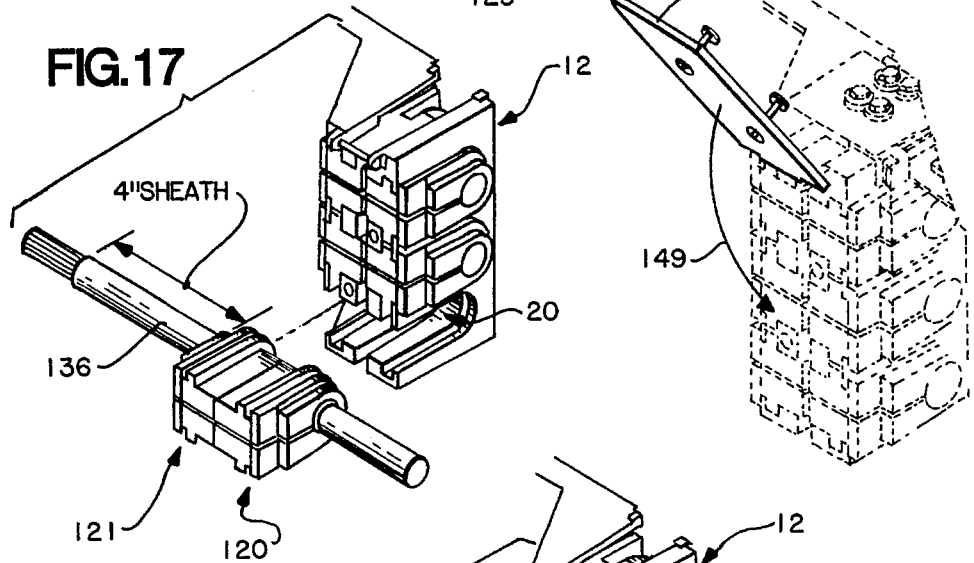
FIG. 18
FIG. 17
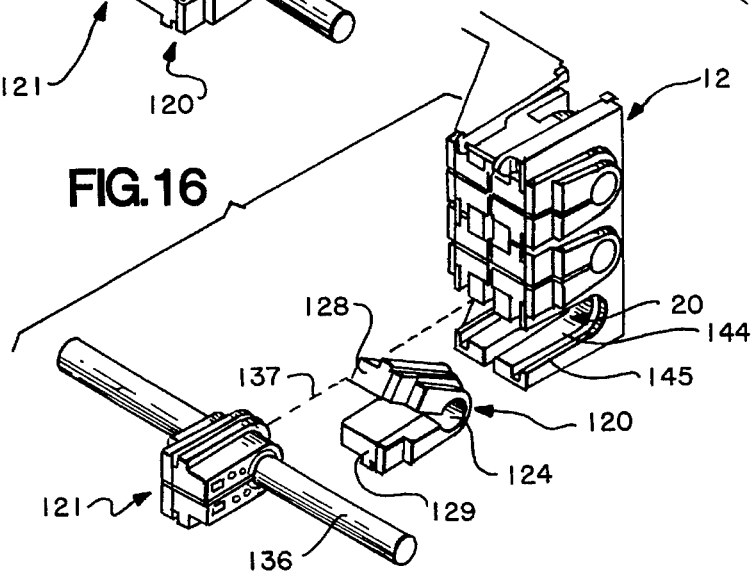
FIG. 16

OPTICAL FIBER SPLICE CLOSURE

BACKGROUND OF THE INVENTION

This invention relates generally to apparatus for containing splices between optical fibers, and more particularly relates to aerial apparatus for containing splices between optical fibers and which aerial apparatus is sometimes referred to in the art as an aerial closure, a free-breathing aerial closure, or an aerial breathable fiber closure.

Several of such apparatus are known to the art, however, there exists a need for a new and improved apparatus for containing splices between optical fibers which is particularly useful as an aerial closure mountable to a metal cable or strand extending between poles. Further, there exists a need in the art for a new and improved stacker which stacks a plurality of optical fiber splice trays or organizers in a more orderly manner and which presents the trays for more ready access, one at a time, to cable splicing personnel. Still further, there exists a need in the art for a new and improved grommet which provides improved sealing between optical fiber cables entering and exiting the apparatus and which are more convenient for use by personnel, particularly optical fiber splicing personnel working early, in making a substantially air-tight seal between optical cables entering and exiting the apparatus and the apparatus.

SUMMARY OF THE INVENTION

It is the object of the present invention to satisfy the above-noted needs in the art.

Apparatus for containing splices between optical fibers contained in optical fiber cables and embodying the present invention may include a frame providing a plurality of optical fiber cable entry/exit ports, splice tray stacker mounted to the frame and for stacking a plurality of optical fiber splice trays, and an outer cover for being fastened closed around the frame and splice tray stacker to provide mechanical and environmental protection thereto. The apparatus may include grommets providing improved sealing between the apparatus and optical fiber cables entering and exiting the apparatus.

BRIEF DESCRIPTION OF THE DRAWINGS

FIG. 2 is a front elevational view, partially in dashed outline, illustrating the entry and exit of optical fiber cables into and out of the frame of the present invention and also illustrating the routing of optical fibers on the frame;

FIG. 3 is a transverse diagrammatical illustration of a typical optical fiber cable;

FIG. 4 is a partial view, partially in dashed outline, illustrating the mounting of an optical fiber cable and a central strength member to the frame of the present invention;

FIG. 6 is a partial bottom view of the base and wall of the splice tray stacker of the present invention;

FIG. 9 is a partial view, in perspective, of portions of the bottom of the fold-down tray and base of the splice tray stacker of the present invention illustrating the manner in which the fold-down movement of the table is limited with respect to the base;

FIG. 10 is a perspective view illustrating the manner in which the dividers of the present invention may be mounted to the base of the tray stacker of the present invention to provide different spaces between the dividers to accommodate the stacking of optical fiber splice trays of different thicknesses;

FIG. 10A is an enlarged partial view of a mounting projection provided on the bottom of the dividers of the present invention;

FIG. 11 is a diagrammatical plan view illustrating the mounting of the dividers to the base of the splice tray stacker to provide different distances between the dividers;

FIG. 12 is an exploded view, in perspective, of a pair of grommets of the present invention;

FIG. 13 is a diagrammatical plan view illustrating in detail the tapered passageway provided by the grommets for sealingly engaging optical fiber cables;

FIG. 14 is a cross-sectional view taken substantially along the line A—A in FIG. 12 in the direction of the arrows;

FIG. 15 is a cross-sectional view taken substantially along the line B—B in FIG. 12 in the, direction of the arrows;

FIGS. 16 and 17 are exploded views illustrating the manner in which the grommets of the present invention sealingly engage an optical fiber cable and further illustrating the manner in which the grommets in sealing engagement with a fiber optic cable are mounted in the entry/exit ports of the present invention; and FIG. 18 is a perspective view, partially in dashed outline, illustrating the manner in which the grommet doors or pressure, members provide pressure or force to the grommets to further insert or force the grommets into the entry/exit ports of the present invention and to force the grommets into further sealing engagement with an optical fiber cable.

DESCRIPTION OF THE PREFERRED EMBODIMENT

Figure 1:
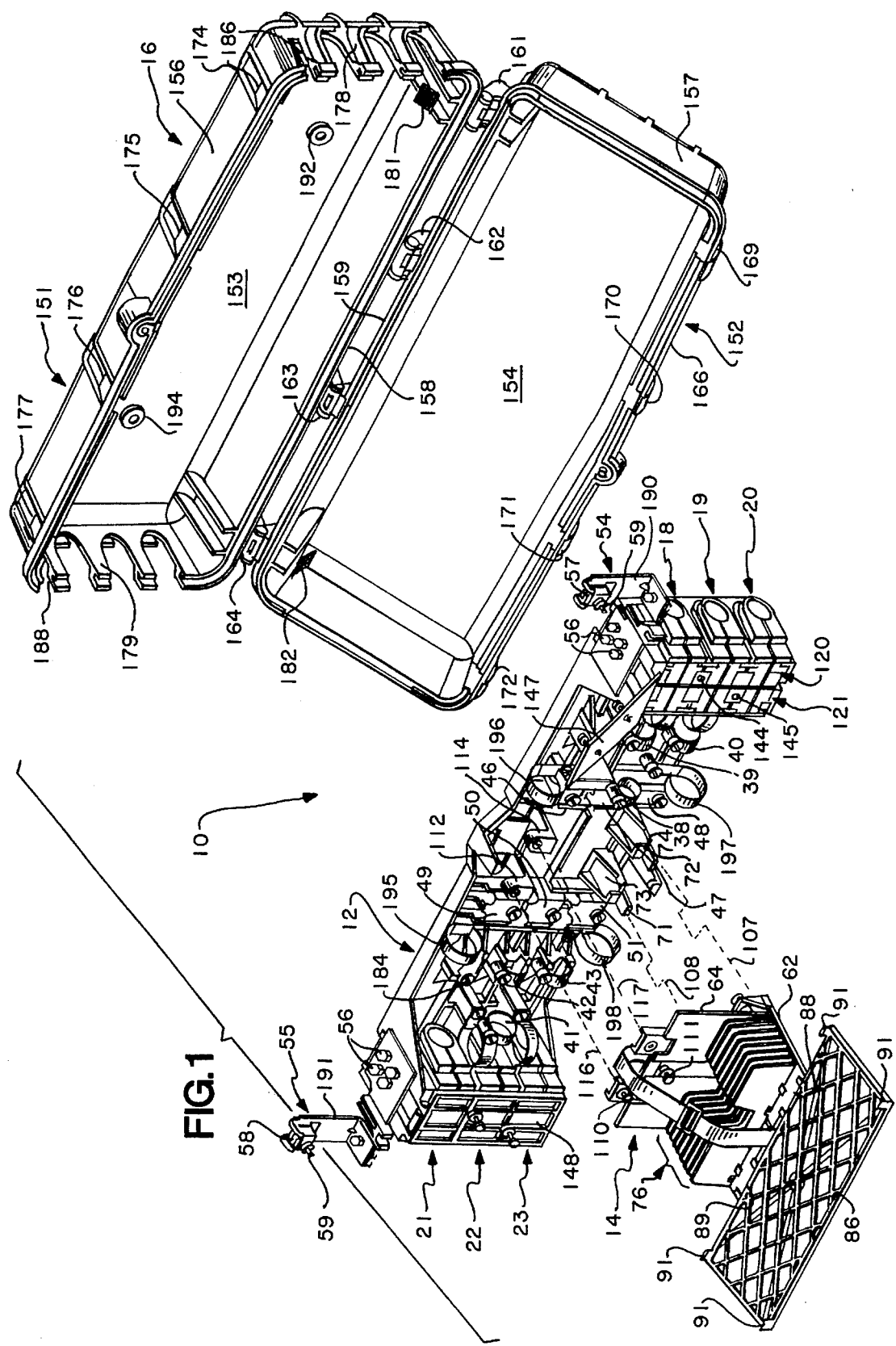
FIG. 1 is an exploded perspective view of closure apparatus embodying the present invention and illustrating the frame, splice tray stacker, and outer cover of the present invention.

Referring to FIG. 1, there is shown apparatus for containing splices between optical fibers contained in optical fiber cables and which apparatus is indicated by general numerical designation 10. Apparatus 10 is particularly useful as an aerial enclosure for containing splices between optical fibers and provides a flexible fiber splicing system for fiber trunk, feeder or distribution optical fiber cables. The apparatus of the present invention is usable in either a butt or in-line configuration splices between optical fibers. The apparatus 10 of the present invention includes three main or primary components: a frame indicated by general numerical designation 12, a splice tray stacker indicated general numerical designation 14 and an outer cover indicated by general numerical designation 16. Generally, the frame 12 provides a plurality of entry/exit ports for the entry and exiting of optical fiber cables as may be better understood by reference to FIG. 2 showing the entry/exit of optical fiber cables 25, 26 and 27. Further, generally, the splice tray stacker 14 is for storing a plurality of optical fiber splice trays; the slice tray stacker 14, in the preferred embodiment, is mounted removably to the frame 12. The outer cover 16, generally, is for surrounding and being fastened closed over the frame 12 and splice tray stacker 14 to provide them with mechanical and environmental protection.

A representative or typical optical fiber cable is illustrated in transverse cross-section in FIG. 3 and indicated by general numerical designation 30. Cable 30 typically includes an outer protective sheath 31 surrounding a plurality of typically circularly arranged buffer tubes 33, each containing a plurality of individual optical fibers, and a central strength member 35 typically made of fiberglass. To provide strain relief for splices between individual optical fibers, the frame 12, referring again to FIG. 1, is provided with a plurality of mounting members 38, 39 and 40 and 41, 42 and 43 for mounting the cables to the frame 12 and a second plurality of mounting members 46, 47 and 48 and 49, 50 and 51 for mounting the central strength members of the cables to the frame 12. This may be better understood by reference to FIG. 4 wherein the mounting of the cable 27 to the frame 12 by representative mounting member 41 is shown in detail and wherein the mounting of the central strength member 32 to the frame 12 by the representative mounting member 49 is shown in detail. From FIG. 4, it will be understood that the mounting member 41 may be a suitable hose clamp including a threaded fastener 45 for being threaded into a threaded insert (not shown) mounted in the frame 12. The mounting member 49 may be a suitable clamp configured as shown in FIG. 4 and in FIG. 1 and which includes a threaded fastener 51 for being threaded into a threaded insert (not shown) mounted in the frame 12.

Figure 5:
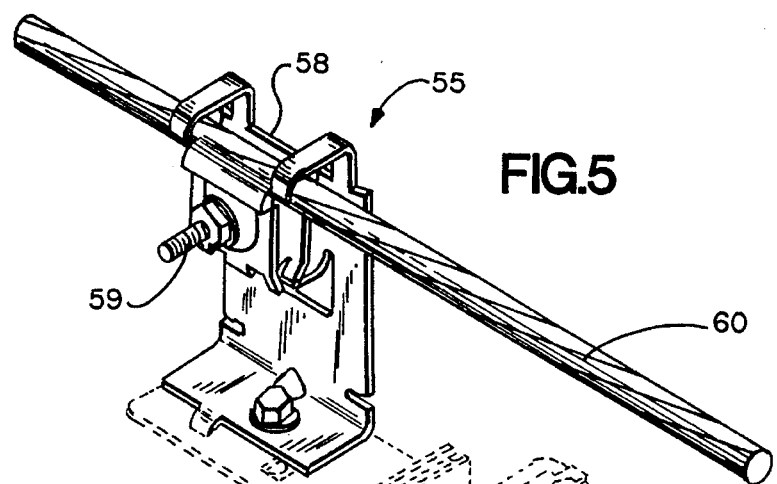
FIG. 5 is a partial view, partially in dashed outline, illustrating the frame of the present invention to a support strand or metal cable.

When embodied as an aerial closure, the frame 12 of the apparatus 10 of the present invention is provided with a pair of suitable strand mounting members indicated by general numerical designations 54 and 55, FIG. 1. These strand mounting members may be suitably mounted to the frame 12 by suitable threaded fasteners 56 and may include expandable and contractible strand clamping members 57 and 58 including threaded fasteners 59 for being threaded into threaded inserts (not shown) provided on the members 54 and 55 to clamp the members 57 and 58 to a metal cable or strand extending between poles. A detailed illustration of the mounting of the frame 12 to a metal cable or strand, such as strand 60, is shown in FIG. 5 with regard to strand mounting member 55.

Figure 7:
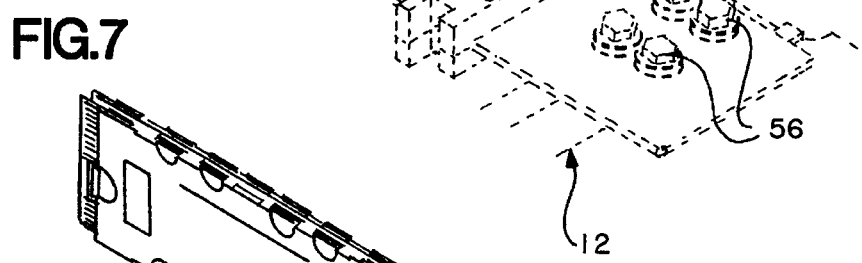
FIGS. 7 and 8 are perspective views illustrating the manner in which dividers may be mounted to the base of the splice tray stacker of the present invention.

The splice tray stacker 14, FIG. 1, is generally L-shaped in side view and includes a base 62 and a wall 64 extending upwardly from the base at substantially 90° with respect thereto. The base 62 and wall 64 may be formed integrally, or separately, and suitably secured together such as by threaded fasteners 65 as indicated in FIG. 6. In the preferred embodiment, as shown in FIG. 6, the base 62 and wall 64 cooperatively provide openings 67 and 68 for receiving projections 71 and 72, referring now to FIG. 1, extending upwardly from the stacker mounting members 73 and 74 extending outwardly from the frame 12. A plurality of dividers 76 are mounted removably to the base 62 and extend upwardly therefrom to provide spaces therebetween, as shown in FIG. 7, for receiving a plurality of optical fiber splice trays indicated by general numerical designation 78 in FIGS. 7 and 8. Such optical fiber splice-trays are well known to the art, are sometimes referred to as splice tray organizers and the like, and are used to organize and store splices between individual optical fibers and to store an excess or surplus of optical fibers for use in future splicing. The splice tray stacker 14 and dividers 76 organize the splice trays 78 and present them for ready access by splicing personnel. The splice tray stacker 14, FIG. 8, may be provided with a suitable pair of straps 81 and 82, secured to the base 62, and which straps include, for example, Velcro® patches to be placed in opposition and engagement to fasten the plurality of optical splice trays 78 to the splice tray stacker 14 as is illustrated in FIG. 8.

Figure 8:
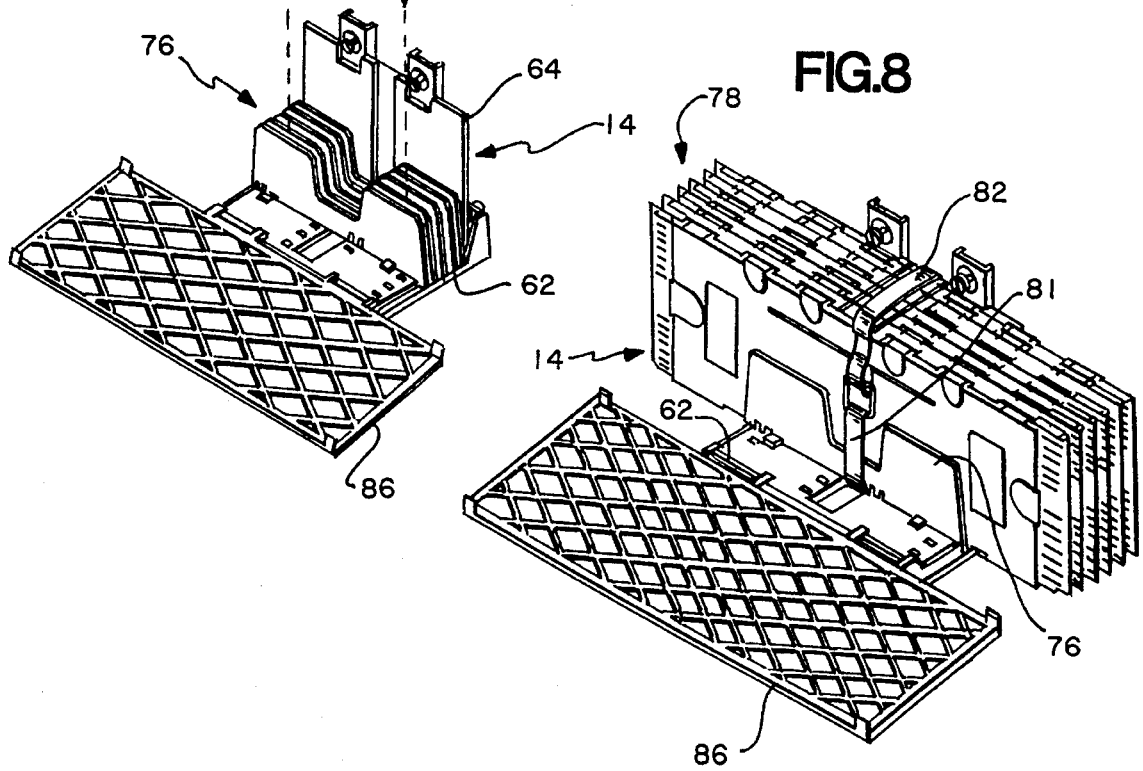

The splice tray stacker 14, FIGS. 1, 7 and 8, may be provided, in the preferred embodiment, with a fold-down splicing table 86 mounted hingedly to the base 622 by suitable hinges 88 and 89 as may be best seen in FIG. 1. The fold-down splicing table 86 is for receiving and supporting an optical fiber splice tray 78 while splices are being made to the optical fibers contained therein by splicing personnel. The fold-down table 86 may be provided, at its corners, with a plurality of upwardly extending flexible members 91 for engaging an optical fiber splice tray 78 in a snap fit. The splice tray 86, with a splice tray 78 snap-fitted thereto, enables hands-free splicing by splicing personnel which is particularly advantageous when such splices are made aerially.

The fold-down table 86, FIG. 9, may be provided with two pairs of stop members for engaging portions of the hinges 88 and 89 (FIG. 1) to limit the downward folding of the tray 86 with respect to the base 62 as illustrated by the curved arrows in FIG. 9; pair of stop, members 94 and 95 and hinge 88 are shown in FIG. 9.

As is further known to those skilled in the art, splices between individual optical fibers can be made in either single or mass fusion configurations. As is further known, single fusion splices are smaller in diameter or thickness than mass fusion splices, and as is still further known in the art, optical fiber splice trays, such as trays 76, are provided in different thicknesses, a narrower thickness for accommodating single fusion splices and a greater thicknesses for accommodating mass fusion splices. The splice tray stacker base 62 and dividers 76 of the present invention are provided with cooperating means for varying the spacing between the dividers to accommodate optical fiber splice trays of different thicknesses. As may be understood from FIGS. 7, 10 and 11, the splice tray stacker base 62 is provided with a plurality of laterally spaced rows of holes, such as row of holes 101 and 102 and row of holes 104 and 105 shown in FIG. 11. It will be noted from FIG. 11 that row of holes 101 and 102 and row of holes 104 and 105 are displaced laterally with respect to each other, i.e., the row of holes 101 and 102 is displaced leftwardly in FIG. 11 with respect to the row of holes 104 and 105, or conversely the row of holes 104 and 105 is displaced rightwardly with respect to the row of holes 101 and 102. The dividers 76, note divider 76A shown in FIG. 10, are provided along their bottom edge with a pair of downwardly extending flexible projections 108 and 109 (projection 109 is shown in greater detail in FIG. 10A) for being wedgedly received in the holes formed in a row of such holes to mount the dividers removably to the splice trays tacker base 62. With regard to the variable spacing, upon the projections 108 and 109 of the dividers 76A being snap fitted into row of holes 101 and 102, the divider 76A is spaced a first distance D1 from the adjacent divider 76B to accommodate and stack thinner optical fiber splice trays containing the thinner single fusion splices. However, with respect to its former position or orientation, upon the divider 76A, FIG. 10, being rotated or reoriented 180° with respect to its former position or orientation, as indicated by the curved arrows in FIG. 10, and upon the downwardly extending projections 108 and 109 of the divider 76A being received in row of holes 104 and 105 (FIG. 11), the divider 76A is now spaced a second distance D1, greater than distance D2, from the adjacent divider 76 to provide a larger space for accommodating and stacking thicker optical fiber splice trays containing the thicker fusion splices. Accordingly, it will be understood in accordance with the teaching of the present invention that a single set of dividers and a single splice tray stacker may be used to accommodate and store optical fiber splice trays of different thicknesses.

The splice tray stacker 14, FIG. 1, is mounted removably to the frame 12, as indicated by the broken lines 107 and 108 by inserting the projections 71 and 72 on the stacker mounting members 73 and 74 into the openings 67 and 68, FIG. 6, provided on the stacker 14 and by threading the threaded fasteners 110 and 111, provided on the stacker 14, into threaded inserts provided on the stacker mounting members 112 and 114 extending outwardly from the frame 12. The threaded inserts, due to the smallness of size, are not shown in FIG. 1, but it will be understood that such threaded inserts are mounted in the circular openings shown in the outer portions of the mounting members 112 and 114. The threaded fastening of the fasteners 110 and 111 is also indicated diagrammatically in FIG. 1 by the dashed lines 116 and 117.

The entry/exit ports 18, 19 and 20 and 21, 22 and 23, FIG. 1, are provided with grommets which engage the optical fiber cables, entering and exiting these ports and provide a substantially air-tight seal around the cables. A pair of grommets are mounted in each port, for example, a pair of grommets 120 and 121 are mounted in port 20 and these grommets, representative of the other grommets, are shown separated,, enlarged, and in greater detail in FIG. 12 where they are indicated by general numerical designations. It will be generally understood, and referring to the diagrammatical illustration of FIG. 13, that the representative grommets 120 and 121 cooperatively provide an internal passageway indicated by general numerical designation 122 including or defined by two axially aligned, truncated, conical passageway sections 124 and 125 tapering or narrowing inwardly as illustrated in FIG. 13. These truncated conical passageway sections 124 and 125 are shown in dashed outline in FIG. 12. The representative pair of grommets 120 and 121, FIG. 12, are each generally U-shaped and include a generally semicircular portion 127 extending into two generally parallel straight portions 128 and 129. It will be noted from FIG. 12 that the truncated conical passageway sections or portions 124 and 125 extend through the generally semi-circular portions 127.

From the cross-sectional view of FIG. 14, it will be understood that at the narrowest portion of the truncated conical passageway section or portion 124 the representative grommet 120 is provided with a thin wall 131 transverse to and normally occluding the passageway section 124 and normally preventing the passage of air therethrough. From FIG. 12, it will be noted that the generally straight portions 128 and 129 of the grommets 120 and 121 have a longitudinally extending space 133 therebetween and from the cross-sectional view shown in FIG. 15 of grommet 120, it will be noted that a thin wall 134 extends longitudinally between the generally straight portions 128 and 129 normally occluding the space 133 to normally prevent the passage of air through the space 133.

It will be understood that representative grommets 120 and 121 are made of a suitable flexible material, such as for example a suitable and commercially available thermoplastic elastomeric material. It will be understood that the thin walls 131 and 134, FIGS. 14 and 15, normally close and seal the entry/exit ports 18, 19 and 20 and 21, 22 and 23, FIG. 1, when no optical fiber cable is entering or exiting such ports. By making the grommets 120 and 121 of such flexible thermoplastic space elastomeric material, the grommets are sufficiently flexible, and the walls 131 and 134, FIGS. 14 and 15 sufficiently thin, that the application of manual force, provided by the hands and/or fingers of optical fiber splicing personnel, can spread the generally straight portions 128 and 129 apart, as shown in FIG. 16 with regard to grommet 120, and such spreading apart both ruptures the thin walls 131 and 134 and opens the truncated, conical passageway section or portion 124 to permit the entry of the optical fiber cable 136 into the passageway section 124 as indicated by the dashed line 137 in FIG. 16; from FIG. 16, it will be understood that the grommet 121 was previously spread apart and the optical fiber cable 136 inserted into the truncated conical section or passageway 125, FIG. 12.

As may be understood by reference to FIGS. 12 and 17, the grommets 120 and 121 and the entry/exit port 20, representative of all grommets and ports, are provided with cooperating ribs and grooves for mounting the grommets in the ports with the grooves receiving the ribs; note ribs 141 and 142 and groove 143 provided on grommet 120, FIG. 12, and rib 144 and groove 145 at entry/exit port 20. It will be understood, for example, that upon the optical fiber cable 136, FIG. 17, being received within the tapered passageway 122, FIG. 13, the straight portions of the grommets 120 and 121 will be slightly spread apart and upon the manual forced entry of the grommets and optical fiber cable 136 into the entry/exit port 20 the straight portions of the grommets will be forced towards each other to further force the grommets into sealing engagement with the optical fiber 136. It will be further understood that the grommets of the present invention, e.g. grommets 120 and 121, are self-sizing in that the tapered passageway 122, FIG. 13, comprised of the axially aligned, truncated conical portions or sections 124 and 125, upon the straight members 128 and 129 being forced towards each other during mounting into the exit ports, will sealingly engage the optical fiber because the diameters of the openings of the conical sections 124 and 125, FIG. 13, are larger than the diameter of the optical fiber cable 136 and because the narrowest inward diameter of the truncated conical sections or portions 124 and 125 are smaller in diameter than the diameter of the optical fiber cable. This assures self sizing sealing engagement between the grommets and the cables.

To further assure seating of the grommets in the entry/exit ports, and to further assure sealing engagement between the grommets and the optical fiber cables, the frame 12, note FIGS. 1 and 18, is provided with a pair of grommet doors or pressure applying members 147 and 148 mounted hingedly to the frame 12. The grommet doors 147 and 148 are provided with suitable threaded fasteners extending therethrough which are received within threaded inserts (not shown) provided in the frame 12, to force the grommet doors into engagement with the grommets and to further force and seat the grommets into the entry/exits ports and further force the grommets into sealing engagement with the optical fiber cables. The downward pivoting of the hinged grommet door or pressure member 148 is indicated by the curved arrow 149 in FIG. 18.

To still further assure sealing of the grommets around the optical fiber cables, in the preferred embodiment, it will be understood that the generally straight portions 128 and 129, FIG. 12, of the grommets, are provided with an outward taper as are the ribs 141 and 142 and groove 143. Also, in the preferred embodiment, FIG. 16, the groove 144 and rib 145 provided at the entry/exit port 20 are provided with an outward taper whereby upon the insertion of the grommets surrounding an optical fiber cable such insertion and seating in the entry/exit port further compresses the straight portions of the grommets towards each other and forces the grommet, particularly the conical surfaces providing the tapered passageway 122, FIG. 13, into still further sealing engagement with the optical fiber cable.

Referring now to the outer cover 16 shown in FIG. 1, it will be noted that the cover is of generally clam shell type or configuration and includes a pair of hinged cover members indicated by general numerical designations 151 and 152. The cover members 151 and 152 include, respectively, bases 153 and 154 which are, respectively, circumscribed by outwardly extending walls 156 and 157. The generally opposed cover edges 158 and 159 are provided with cooperative hinge forming members providing the hinges 161 and 162, 163 and 164. The edge 166 of the cover member 154 is provided with a plurality of latch members 169, 170, 171 and 172 of the type known to the art, for engaging and latching to outwardly extending ridge portions 174, 175, 176 and 177 provided on the wall 156 of cover member 151 to latch and fasten the cover members 151 and 152 closed and fastened around the frame 12 with stacker 14 mounted removably thereto as described above. The outer cover 151 provides mechanical and environmental protection to the frame 12 and stacker 14 and, of course, optical fibers and optical fiber splices contained therein. As may be further understood from FIG. 1, the end walls 178 and 179 of the cover member 151 are provided with a plurality of indentations for receiving optical fiber cables entering and exiting the frame 12 upon the cover 16 being fastened around the frame and tray stacker 14. In addition, the cover members 151 and 152 may be provided, respectively, with screen filled openings 181 and 182 to permit the relatively free flow of air in and out of the cover 16 upon being fastened around the frame 12 and tray stacker 14 so that the temperature and humidity of the air inside and outside the cover are substantially the same. This substantially eliminates the formation of condensation in the cover 16 upon being closed and fastened around the frame and tray stacker. It will be understood that the mesh of the screen is sufficiently large to permit the free flow of air therethrough as described and sufficiently small to prevent the entry of unwanted debris and the like. Also, the wire of the mesh is sufficiently strong to substantially prevent the entry of rodents into the cover and to prevent the wire from being ruptured by rodents. With the inclusion of the screened openings 181 and 182, it will be understood that the apparatus 10 of the present invention may be said to be a free-breathing closure or an aerial breathable fiber enclosure. Also, the end walls 178 and 179 of the cover member 151 are respectively provided with indentations 186 and 188 to accommodate or permit the passage therethrough of the shafts 190 and 191 of the strand clamps 54 and 55.

The frame 12 may be mounted removably to the base 153 of the cover portion 151. For such mounting, the base 153 of the cover portion 151 is provided with a pair of threaded inserts 192 and 194 for threadedly receiving a pair of threaded fasteners provided on the frame 12 in corresponding positions. Threaded fastener 184, FIG. 1, extends rotatably through the frame 12 and is for threaded engagement with the threaded insert 182; the other threaded fastener provided on the frame 12 is not shown in FIG. 1 because it is obscured by the rightward portion of the frame including the grommets, but such other threaded fastener is threadedly received in the threaded insert 181.

Referring again to FIGS. 1 and 2, it will be understood that the frame 12 may be provided with a plurality of optical fiber routing rings 195, 196, 197 and 198 for routing the optical fibers around the frame 12 as illustrated particularly in FIG. 2.

The frame 12, splice tray stacker 14, dividers 76, fold-down table 86 and cover 16 may be made of a suitable plastic, such as for example commercially available ABS/PVC and may be suitably injection molded. The strand mounting members 54 and 55 may be made of a suitable stainless steel, and the various threaded fasteners may be suitable threaded fasteners or preferably ¼ turn fasteners.

It will be understood that many modifications and variations may be made in the present invention without departing from the spirit and the scope thereof.

What is claimed is:

1. Apparatus for containing splices between optical fibers contained in optical fiber cables, said optical fiber cables including central strength members, comprising:

a frame providing a plurality of optical fiber cable entry/exit ports;

said frame provided with first mounting members for mounting said cable to said frame and second mounting members for mounting said central strength members to said frame to relieve strain on said splices between said optical fibers;

splice tray stacker mounted to said frame and for stacking a plurality of splice trays; and an outer cover for being fastened closed around said frame and said splice tray stacker to provide mechanical and environmental protection thereto.

2. Apparatus for containing splices between optical fibers contained in optical fiber cables, comprising:

a frame providing a plurality of optical fiber cable entry/exit ports;

self-sizing grommets mounted in said entry/exit ports, said grommets including tapered passageways for receiving said cables in sealing engagement;

splice tray stacker mounted to said frame and for stacking a plurality of splice trays; and an outer cover for being fastened closed around said frame and said splice tray stacker to provide mechanical and environmental protection thereto.

3. The apparatus according to claim 1 or 2 wherein said frame and said stacker are provided with cooperating stacker mounting means for mounting said stacker removably to said frame.

4. The apparatus according to claim 1 or 2 wherein said splice tray stacker includes a fold-down splicing table for supporting a splice tray during splicing of optical fibers.

5. The apparatus according to claim 4 wherein said fold-down splicing table is provided with a plurality of outwardly extending flexible members for engaging one of said splice trays in a snap fit to removably mount said one splice tray to said table to facilitate the splicing of optical fibers on said one splice tray.

6. The apparatus according to claim 1 or 2 wherein said outer cover is provided with at least one opening permitting the substantially free flow of air therethrough to maintain the heat and humidity of air inside and outside said cover substantially the same to substantially eliminate the formation of condensation within said cover.

7. The apparatus according to claim 1 or 2 wherein said tray stacker includes a plurality of dividers providing spaces therebetween for receiving said splice trays.

8. The apparatus according to claim 7 wherein said dividers and said stacker are provided with cooperative divider mounting means for mounting said dividers removably to said stacker at different positions to vary the space between said dividers to accommodate the stacking of splice trays of different thicknesses between said dividers.

9. The apparatus according to claim 8 wherein said splice tray stacker is generally L-shaped in side view and includes a base and a wall extending upwardly from said base at substantially 90° with respect to said base, wherein said dividers have a bottom edge, wherein said cooperative divider mounting means comprise at least a pair of projections extending downwardly from said bottom edge of said dividers and a plurality of laterally spaced rows of holes provided in said base and extending substantially parallel to said wall, said rows of holes for receiving said provided on said dividers to mount said dividers on said base, the holes in adjacent rows being displaced laterally with respect to each other and upon said pair of projections provided on one of said dividers residing in the holes of one of said rows said one divider being spaced a first distance from the next adjacent divider and upon said one divider being rotated 180° and said pair of projections of said one divider being placed in the holes in next row away from said adjacent divider, said one divider being spaced a second distance from said first divider greater than said first distance.

10. The apparatus according to claim 1 or 2 wherein said splice tray stacker is provided with means for fastening said splice trays to said stacker.

11. The apparatus according to claim 10 wherein said means for fastening said splice trays to said stacker comprise a flexible strap mounted to said stacker and for being fastened around said splice trays.

12. Apparatus according to claim 1 or 2 wherein said splice tray stacker is generally L-shaped in side view and includes a base having an edge and a wall extending wall upwardly from said edge at substantially 90° with respect to said base, wherein said frame is provided with first and second stacker mounting means, said first stacker mounting means for receiving and supporting said stacker base, and said second stacker mounting means and said stacker wall provided with fastening means for fastening said wall to said second stacker support means.

13. The apparatus according to claim 12 wherein said first stacker support means comprise a first pair of stacker support members extending outwardly from said frame at substantially 90° with respect thereto and which first pair of stacker support members include a pair of upwardly extending projections, wherein said stacker base and wall cooperatively provide a pair of openings for receiving said projections, wherein said second stacker mounting means comprise a second pair of stacker support members extending outwardly from said frame at substantially 90° with respect thereto and wherein said stacker wall and said second pair of supporting members are provided with cooperative threaded fastening means for fastening said wall to said second pair of stacker support members.

14. Apparatus according to claim 13 wherein said splice tray stacker is provided with a hingedly mounted fold-down splicing table for supporting a splice tray during splicing of optical fibers, said table provided with stop members for engaging said stacker to limit the extent to which said table can be folded down from said stacker.

15. The apparatus according to claim 2 wherein said apparatus is aerial apparatus for being mounted to a strand extending between poles, and wherein said frame is provided with strand mounting members for mounting said frame removably to said strand and wherein said outer cover is provided with openings through which said strand mounting members extend.

16. The apparatus according to claim 1 wherein said apparatus further comprises grommet means mounted in said entry/exit ports for engaging said optical fiber cables and providing a substantially air-tight seal around said cables at said ports.

17. The apparatus according to claim 16 wherein said grommet means provide a passageway for sealingly receiving an optical fiber cable and wherein said passageway is defined by two axially aligned, truncated conical passageway sections narrowing inwardly.

18. The apparatus according to claim 17 wherein said grommet means comprise a pair of juxtaposed grommet members, each grommet member being generally U-shaped and including a generally semi-circular portion extending into two generally parallel straight portions, one of said conical passageway sections extending through said generally semi-circular portion, and said grommet member made of flexible material sufficiently flexible to permit said generally parallel straight members to be spread apart to open said one conical passageway section to facilitate insertion of one of said optical fibers into said one conical passageway section.

19. The apparatus according to claim 18 wherein said grommet members and said entry/exit ports are provided with cooperating ribs and grooves, said grooves for receiving said ribs to mount said grommets removably in said entry/exit ports, wherein said ribs and said grooves are provided with complementary tapers and wherein said frame is provided with pressure members for engaging said grommets to force said tapered ribs into said tapered grooves to squeeze said generally parallel straight portions of said grommet members towards each other to enhance the sealing engagement between said grommet members and said cables.

20. The apparatus according to claim 18 wherein said one conical passageway section extending through said generally semi-circular portion includes a narrowest portion, and wherein said grommet member is provided with a first thin wall at said narrowest portion transverse to and normally occluding said passageway and normally preventing the passage of air therethrough, said two generally parallel straight portions having space therebetween and said grommet member provided with a second thin wall extending longitudinally between said straight portions and normally occluding said space therebetween to normally prevent the passage of air through said space, and said first and second thin walls being sufficiently thin to be ruptured by the application of manual force to said straight portions to spread said straight portions apart to permit said conical passageway section to be opened to receive one of said cables.

21. The apparatus according to claim 1 wherein said outer cover includes a pair of hinged clam shell type cover members each including a base circumscribed by an outwardly extending wall, said walls including first and second edges, said first edges provided with hinges for hinging said cover members together and said second edges provided with cooperating fastening means for fastening said cover members closed to each other and around said frame and said splice tray stacker.

22. The apparatus according to claim 21 wherein said frame is mounted removably to one of said cover members.

23. Apparatus for containing splices between optical fibers contained in optical fiber cables, comprising:

a frame providing a plurality of optical fiber cable entry/exit ports;

self-sizing grommets mounted in said entry/exit ports, said grommets including tapered passageways for receiving said cables in sealing engagement;

splice tray stacker mounted to said frame and for stacking a plurality of splice trays, said stacker including a fold-down splicing table for supporting a splice tray during splicing of optical fibers; and an outer cover for being fastened closed around said frame and said splice tray stacker to provide mechanical and environmental protection thereto.

24. The apparatus according to claim 23 wherein said splice tray stacker further includes a plurality of dividers mounted to said stacker providing spaces therebetween for receiving said plurality of splice trays.

25. The apparatus according to claim 2 wherein each of said tapered passageways includes a pair of axially aligned, truncated conical portions tapering inwardly.

26. Apparatus for containing splices between optical fibers contained in optical fiber cables, comprising:

a frame providing a plurality of optical fiber cable entry/exit ports;

self-sizing grommets mounted in said entry/exit ports, said grommets including tapered passageways for receiving said cables in sealing engagement;

splice tray stacker mounted to said frame and for stacking a plurality of splice trays, and said stacker including a fold-down splicing table for supporting a splice tray during splicing of optical fibers; and an outer cover for being fastened closed around said frame and said splice tray stacker to provide mechanical and environmental protection thereto.

27. The apparatus according to claim 26 wherein said splice tray stacker further includes a plurality of dividers mounted to said stacker providing spaces therebetween for receiving said plurality of splice trays.

\* \* \* \* \*